United States Patent [19]

Nickeson et al.

[11] Patent Number: 4,611,545
[45] Date of Patent: Sep. 16, 1986

[54] CONSERVATION NO TILL FARMING APPARATUS

[75] Inventors: James L. Nickeson, Veblen, S. Dak.; John A. Walko, Fargo, N. Dak.

[73] Assignee: Concord, Inc., Fargo, N. Dak.

[21] Appl. No.: 572,218

[22] Filed: Jan. 19, 1984

[51] Int. Cl.⁴ .............................................. A01C 5/00
[52] U.S. Cl. ...................................... 111/52; 111/73; 111/85
[58] Field of Search .................... 111/1, 14, 34, 52, 73, 111/80, 85–88, 77, 89; 172/462, 501, 611

[56] References Cited

U.S. PATENT DOCUMENTS

| | | | |
|---|---|---|---|
| 345,403 | 7/1886 | Arnett | 172/611 X |
| 609,305 | 8/1898 | Spitzenberg | 111/85 |
| 1,197,292 | 9/1916 | Hunter | 111/73 X |
| 1,796,588 | 3/1931 | Buddenbrock | 172/611 X |
| 1,864,122 | 6/1932 | Cole | 111/73 X |
| 1,921,885 | 8/1933 | Kriegbaum et al. | 111/73 |
| 2,241,633 | 5/1941 | Croce et al. | 111/86 X |
| 2,691,353 | 10/1954 | Secondo | 111/73 X |
| 2,968,266 | 1/1961 | Gustafson | 111/85 |
| 3,090,335 | 5/1963 | Caha | 11/85 |
| 3,140,678 | 11/1964 | Morris | 111/52 X |
| 3,335,681 | 8/1967 | Main et al. | 111/73 |
| 3,570,605 | 3/1971 | Rikli | 172/462 |
| 3,705,560 | 12/1972 | Lappin | 111/52 X |
| 4,024,822 | 5/1977 | Ross et al. | 111/34 X |
| 4,417,530 | 11/1983 | Kopecky | 111/73 |

FOREIGN PATENT DOCUMENTS

| | | | |
|---|---|---|---|
| 35746 | 6/1908 | Austria | 111/80 |
| 1097149 | 3/1981 | Canada | 111/34 |
| 25751 | 9/1882 | Fed. Rep. of Germany | 111/14 |
| 2025039 | 12/1971 | Fed. Rep. of Germany | 111/73 |
| 1256111 | 2/1961 | France | 111/80 |
| 25853 | 5/1907 | Sweden | 111/80 |
| 150845 | 7/1955 | Sweden | 172/501 |
| 581901 | 11/1977 | U.S.S.R. | 111/73 |

Primary Examiner—James R. Feyrer
Attorney, Agent, or Firm—Kinney & Lange

[57] ABSTRACT

A conservation no till apparatus for placing seed and fertilizer into the ground in one operation as pulled through the field includes a main implement frame having ground engaging support wheels. Hoppers for supplying the seed and fertilizer are supported on the ground separately from the main implement frame. A plurality of ground working units are mounted to the main implement frame in separate laterally spaced relation by four-bar linkage assemblies. Each ground working unit is thus movable by its linkage assembly between a raised transport position and a lowered ground engaging position, with the linkage assembly for each unit permitting that unit to move vertically independently of the other units when the units are in the ground engaging position. Each ground working unit includes a unit frame and a plurality of ground working tools staggered laterally and longitudinally for engaging the ground and creating separate furrows when the unit is in its ground engaging position. Distribution systems are provided to carry seed and fertilizer from the hoppers and dispense then into the furrows. The height and weight of each unit frame are adjustable to control the depth and force of penetration, respectively, of the tools into the ground.

26 Claims, 7 Drawing Figures

CONSERVATION NO TILL FARMING APPARATUS

BACKGROUND OF THE INVENTION

1. Field of the Invention

The present invention relates to systems for controlled distribution of agriculture material into the ground, and particularly to an apparatus for conservation no till row crop planting operations.

2. Description of the Prior Art

Conservation no till farming methods have recently become quite popular for planting in a variety of situations. No till farming permits a farmer to cut operation costs without sacrificing crop yields. Essentially, no till farming is the planting of seed, the dispensing of fertilizer, and the compaction of the ground adjacent the material dispensed all in one pass through the field. These operations were previously done in several passes through the field, one to till the ground, a second to plant the seed and perhaps others to introduce fertilizer or additionally compact the ground after planting. This required a great deal of labor time in making multiple passes through the field, as well as requiring additional vehicle fuel. Soil and moisture were also lost from the group itself because of the inefficient tillage, planting and compacting methods.

As the benefits of no till farming have been appreciated, attempts have been made to design implements which conserve soil, moisture, labor, fuel and other operating costs, while not sacrificing yields. The following United States patents, which are incorporated by reference herein, illustrate such devices:

| Patent No. | Patentee | Issue Date |
| --- | --- | --- |
| 3,507,233 | Greig et al. | 04/21/70 |
| 3,749,035 | Cayton et al. | 07/31/73 |
| 4,044,697 | Swanson | 08/30/77 |
| 4,333,534 | Swanson et al. | 06/08/82 |
| 4,377,989 | Peterson et al. | 03/29/83 |

The patent to Greig et al. discloses an implement having a plurality of seed drills secured to longitudinally extending beams which are pivotally connected to the implement's frame at their forward ends. Seed or fertilizer is dispensed by each seed drill, but no means are provided for controlling the relative weight applied to each drill for controlling the force of penetration of the drill into the ground. In addition, no means are provided in Greig et al. for simultaneously raising all of the seed drills from the ground to transport the implement from field to field or along the highway.

The patents to Cayton et al., Swanson and Swanson et al. also show row crop planter apparatus having longitudnally extending row units which are pivotally mounted with respect to an implement frame so that the seed drill for each row is free to move generally vertically independently of other seed drills on the implement, but none of these patents disclose means for controlling the weight on each seed drill and thereby controlling the force of penetration of the drill into the ground. In addition, the supply of seed or fertilizer being dispensed by the implements of these patents is carried on the implement frames. As the seed and fertilizer are dispensed, the implement weight decreases accordingly so that during application, the weight of implement bearing down on the seed drills changes drastically, which necessarily changes the penetration force of the seed drills into the ground.

The patent to Peterson et al. discloses a conservation tillage row crop planter apparatus wherein an implement frame has a plurality of tillage units pivotally mounted to the frame and a plurality of planter units, one for each tillage unit, mounted rearwardly thereof. The tillage units are provided only to break and loosen the ground prior to seeding. The planter unit for each row carries a seed storage hopper thereon, so that as seed is dispensed, the weight of the seed hopper decreases, thereby decreasing the force of penetration on the seed drills of each planter unit.

The conservation no till apparatus of the present invention overcomes the stated shortcomings of the prior art. The present invention provides an implement with row crop planting units wherein the weight of each unit is adjustable to vary the force of penetration of the furrow opening tools thereon into the ground. This weight, once established, does not vary as seed and fertilizer are dispensed by each unit in its respective furrows because the supply of seed and fertilizer are supported separately from the units and the implement main frame. The present invention thus provides means for a more precise application of seed and fertilizer in a no till operation than was possible with prior art planting schemes.

SUMMARY OF THE INVENTION

The present invention is a conservation no till apparatus for distributing material into the ground in one operation as pulled through the field by a traction vehicle. The apparatus includes a main implement frame having ground engaging support wheels and hopper means for supplying material to be worked into the ground. A plurality of ground working units are separately mounted with respect to the main implement frame by linkage means in lateral spaced relation. Means are provided for simultaneously moving the units with respect to the main implement frame between a raised transport position and a lowered ground engaging position, with the linkage means permitting each unit to move vertically independently of the other units when the units are in the ground engaging position so that each unit can independently follow the contour of the ground being worked. Each ground working unit includes a unit frame, furrow opening means mounted with respect to the unit frame for engaging the ground and creating a first furrow when the unit is in its ground engaging position and means for dispensing material from the hopper means into the first furrow. Each ground working unit further includes height adjustment means and weight adjustment means on the unit frame for controlling the depth and force of penetration of the furrow opening means into the ground, respectively. Hopper frame means are provided for supporting the hopper means on the ground separate from the ground working units.

In a preferred embodiment, the furrow opening means of each ground working unit includes means for creating second and third furrows spaced laterally from the first furrow and each ground working unit further comprises means for dispensing material from the hopper into the first and second furrows. Means for changing the depth of penetration of the first furrow with respect to the second furrow is also provided. Preferably, the material dispensed from the hopper means into the first furrow is fertilizer and the material dispensed from the hopper means into the second and third furrows is seed and the first furrow is created generally between the second and third furrows. Compaction means are provided for compacting the ground adjacent each furrow after material has dispensed therein.

The conservation no till apparatus of the present invention thus provides means for precisely dispensing seed and fertilizer into the ground in a predetermined cooperating relationship with respect to depth, force of penetration and location. These variables do not change as seed and fertilizer are dispensed because of changes in the amount (weight) of seed and fertilizer carried on the implement, since the seed and fertilizer are carried separately from the ground working units. The weight of each ground working unit is adjustable, however, to vary the force of penetration of that unit's furrow opening means into the ground in order to accommodate differing hardnesses of ground being worked.

BRIEF DESCRIPTION OF THE DRAWINGS

FIG. 5 (Sheet 3) is a schematic illustration of the relative positions of the furrows created by use of the conservation no till system of the present invention.

FIG. 6 (Sheet 3) is a sectional view through the ground as taken along lines 6—6 in FIG. 5.

FIG. 7 (Sheet 3) is an enlarged perspective view of one of the variable weights receivably retained on each of the ground working units of the present invention.

DETAILED DESCRIPTION OF THE PREFERRED EMBODIMENTS

Material Dispensing Implement

Figure 1:
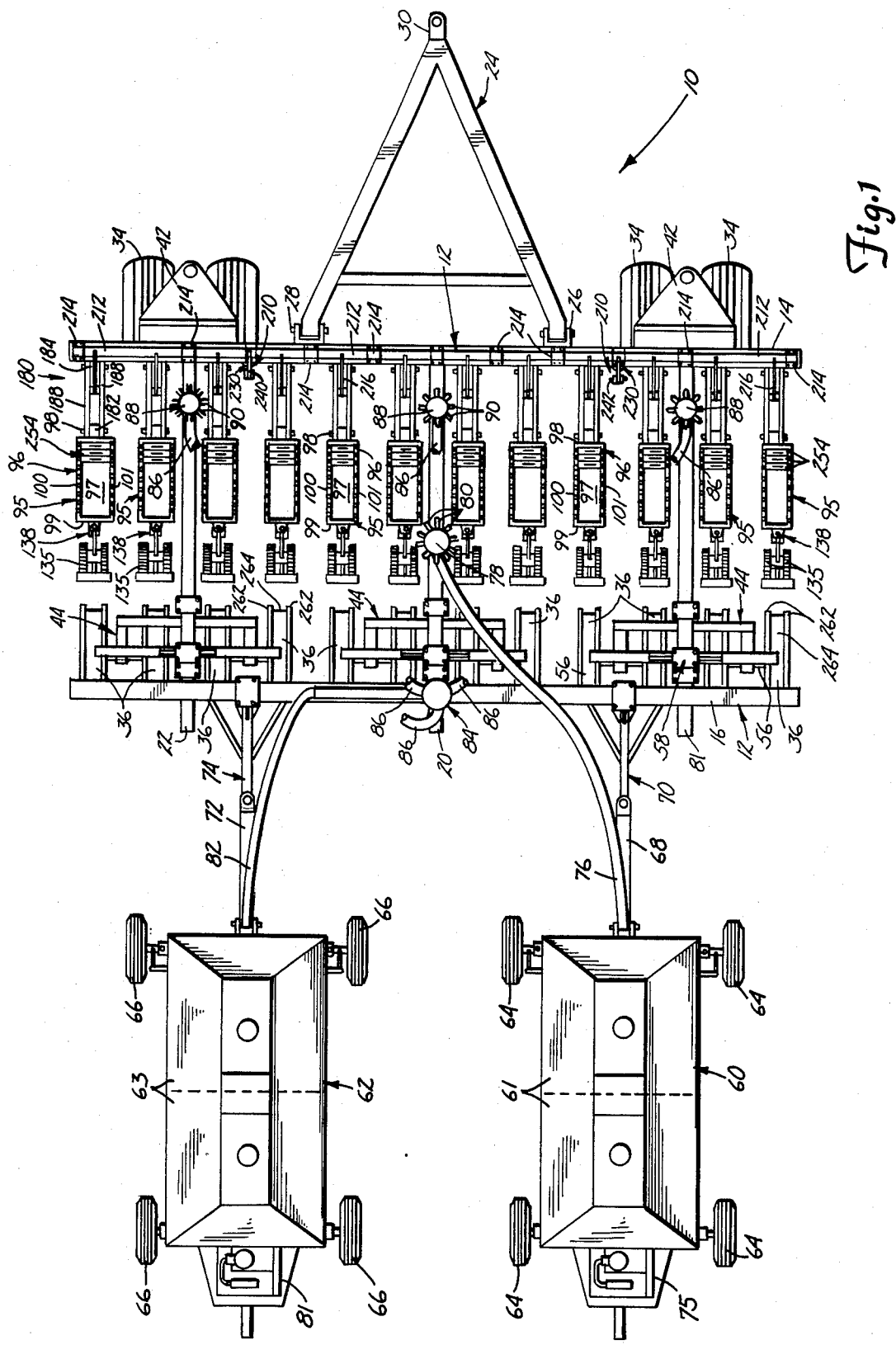
FIG. 1 (Sheet 1) is a top plan view of the conservation no till apparatus of the present invention.
Figure 2:
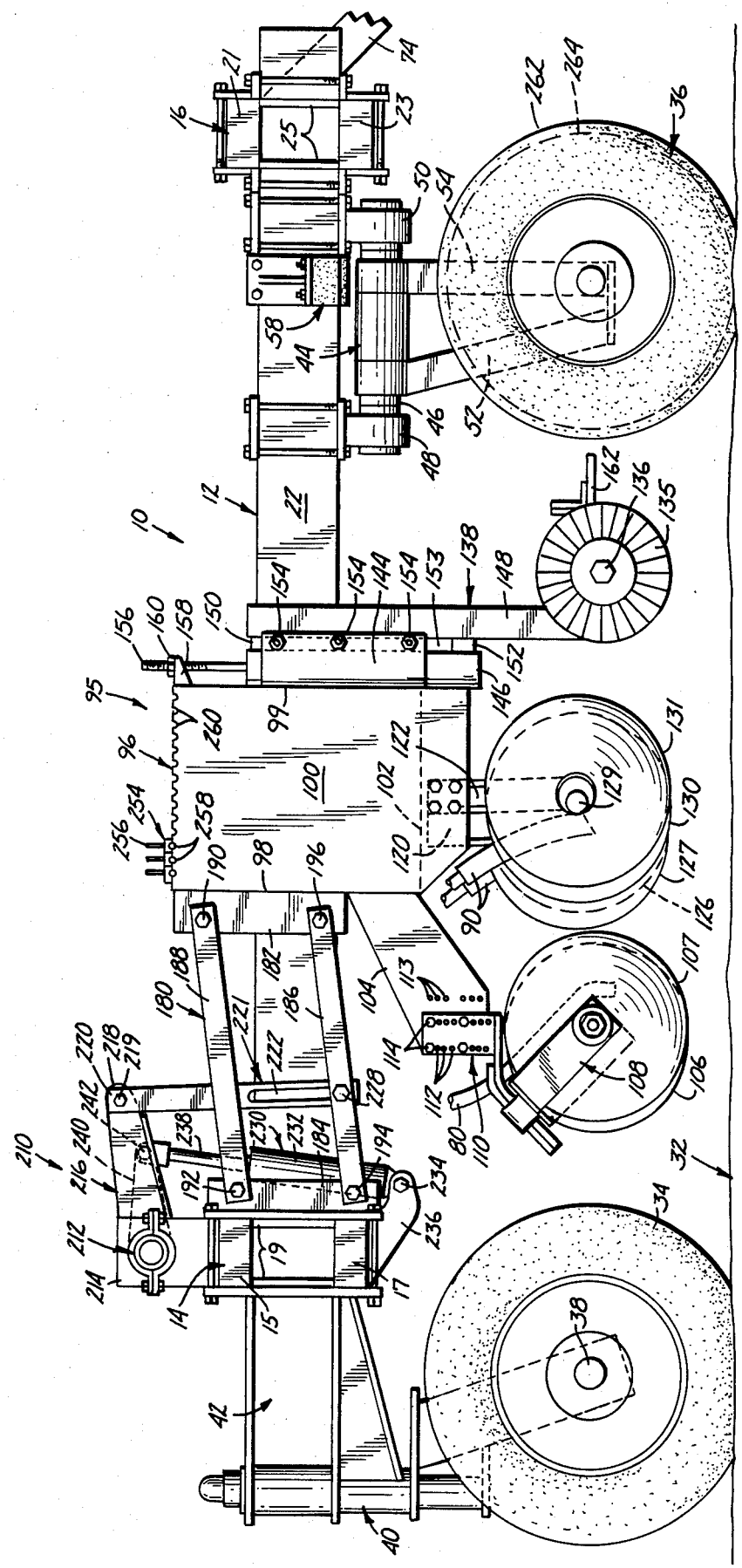
FIG. 2 (Sheet 2) is a side elevational view of the material dispensing implement of the present invention with its ground working units in their raised transport position.

FIG. 1 shows a conservation no till farming apparatus of the present invention for placing seed and fertilizer into the ground. The no till apparatus includes a material dispensing implement 10 which has a main implement frame 12. The main implement frame 12 is primarily defined by a forward lateral beam assembly 14 and a rearward lateral beam assembly 16 which are secured together by longitudinal beams 18, 20 and 22. As shown in FIG. 2, the forward lateral beam assembly 14 consists of first and second lateral beams 15 and 17, which are fixedly spaced apart by spacer plates 19. The rearward lateral beam assembly 16 is similarly configured of third and fourth lateral beams 21 and 23, fixedly spaced apart by spacer plates 25.

A hitch attachment 24 is pivotally mounted as at 26 and 28 to the forward lateral beam assembly 14 of the main frame 12. The hitch attachment 24 has a suitable hitch or clevis 30 for connecting the implement 10 to a traction vehicle such as a tractor (not shown). The implement 10 is thus towed by a tractor from right to left as viewed in FIG. 1.

As best shown in FIG. 2, the main implement frame 12 is supported on the ground (designated generally as at 32) by forward wheels 34 and rear wheels 36. In FIG. 1, it can be seen that there are preferably two pairs of forward wheels 34, one on each side of the hitch attachment 24. Each pair of forward wheels 34 is rotatably mounted on an axle 38 which is secured to an axle bracket 40. Each axle bracket 40 is pivotally mounted on a generally verticle axis like a caster to a forward wheel mount structure 42 which is fixedly secured to the main implement frame 12. Each of the forward wheel pairs 34 is thus free to turn from one side to another as the implement 10 is moved.

The rear wheels 36 are preferably mounted to the main implement frame 12 in gangs of four. As shown in FIG. 2, a rear wheel frame 44 is pivotally secured on a longitudinal axis under each of the longitudinal beams 18, 20 and 22. Each rear wheel frame 44 includes a shaft 46 rotatably mounted on a longitudinal axis to shaft mounts 48 and 50 which are secured to their respective longitudinal beam. Axle brackets 52 and 54 extend downwardly from rear wheel frame 44 and are joined together at lower ends thereof to support an axle 56. The rear wheels 36 are rotatably mounted about the axle 56 as shown. Each group of four rear wheels 36 mounted on a rear wheel frame 44 is thus pivotally mounted on a longitudinal axis under its respective longitudinal beam to better track the contour of the ground as the implement 10 is towed. An axle pivot stop 58 is secured to each of the longitudinal beams between the shaft mounts 48 and 50 to engage the rear wheel frame 44 when it pivots upwardly on each side of the beam, and thereby establish a pivot range for the wheel mounting frame 44.

Material Supply Implement

The no till farming apparatus of the present invention includes at last one implement for carrying and supplying material (seed and/or fertilizer, etc.) to be distributed. Seed is typically dispensed in particulate form while fertilizer may be in particulate form as well or liquified. For seed and fertilizer in particulate form, a suitable particulate feeder for use in the apparatus of the present invention is shown and described in U.S. Pat. No. 4,473,016, assigned to the same assignee as the present invention and which is hereby incorporated by reference.

In FIG. 1, particulate feeders 60 and 62 are supported by suitable frame means and ground engaging wheels 64 and 66, respectively. Particulate feeder 60 has a leading hitch bar 68, which is secured by conventional hitch means to a rear hitch assembly 70 secured to the rearward lateral beam assembly 16 of the implement 10 generally between the longitudinal beams 18 and 20. Similarly, the particulate feeder 62 has a leading hitch bar 72 which is secured by conventional hitch means to a rear hitch assembly 74 mounted to the rearward lateral beam assembly 16 of the implement 10 generally between the longitudinal beams 20 and 22.

The particulate feeder 60 has at least one hopper 61 for carrying fertilizer to be worked into the ground by the material dispensing implement 10. When in particulate form, the fertilizer is carried pneumatically from the hoppers 61 of the feeder 60 to the implement 10 by a fertilizer distribution system which includes a blower 75 and primary distribution tube 76. Tube 76 leads to a fertilizer manifold 78 mounted on the implement main frame 12. The fertilizer manifold 78 equally distributes the fertilizer in the distribution system to a plurality of fertilizer drop tubes 80, portions of which are shown in FIG. 1.

The particulate feeder 62 has at least one hopper 63 for carrying seed to be worked into the ground by the material dispensing implement 10. The seed is similarly carried pneumatically from the hoppers 63 of the feeder 62 to the implement 10 by a seed distribution system which includes blower 81 and a primary distribution tube 82. Tube 82 leads to a first seed manifold 84 mounted on the main implement frame 12. The first seed manifold 84 equally distributes the seed from the primary distribution tube 82 to three secondary distribution tubes 86. Each secondary distribution tube 86 leads to a second seed manifold 88 mounted on the main implement frame 12. Each second seed manifold 88 distributes the seed from its respective secondary distribution tube 86 into a plurality of seed drop tubes 90, portions of which are shown in FIG. 1.

The seed and fertilizer distribution systems are similar in configuration and function to the distribution system disclosed in applicant's assignees copending patent application Ser. No. 421,879 reference above. The particulate being distributed by the material dispensing implement 10 is thus not stored or carried on the main implement frame 12 thereof, but is separately carried by the particulate feeders 60 and 62.

Ground Working Units

The tillage and planter implement 10 has a plurality of ground working units 95 movably mounted to its main implement frame 12. The ground working units 95 are laterally spaced apart and positioned between the lateral beam assemblies 14 and 16 of the main implement frame 12. As best shown in FIGS. 1 and 2, a unit frame 96 for each ground working unit is box-shaped defining a ballast chamber 97 by means of front wall 98, rear wall 99, side walls 100 and 101 and bottom wall 102.

Figure 3:
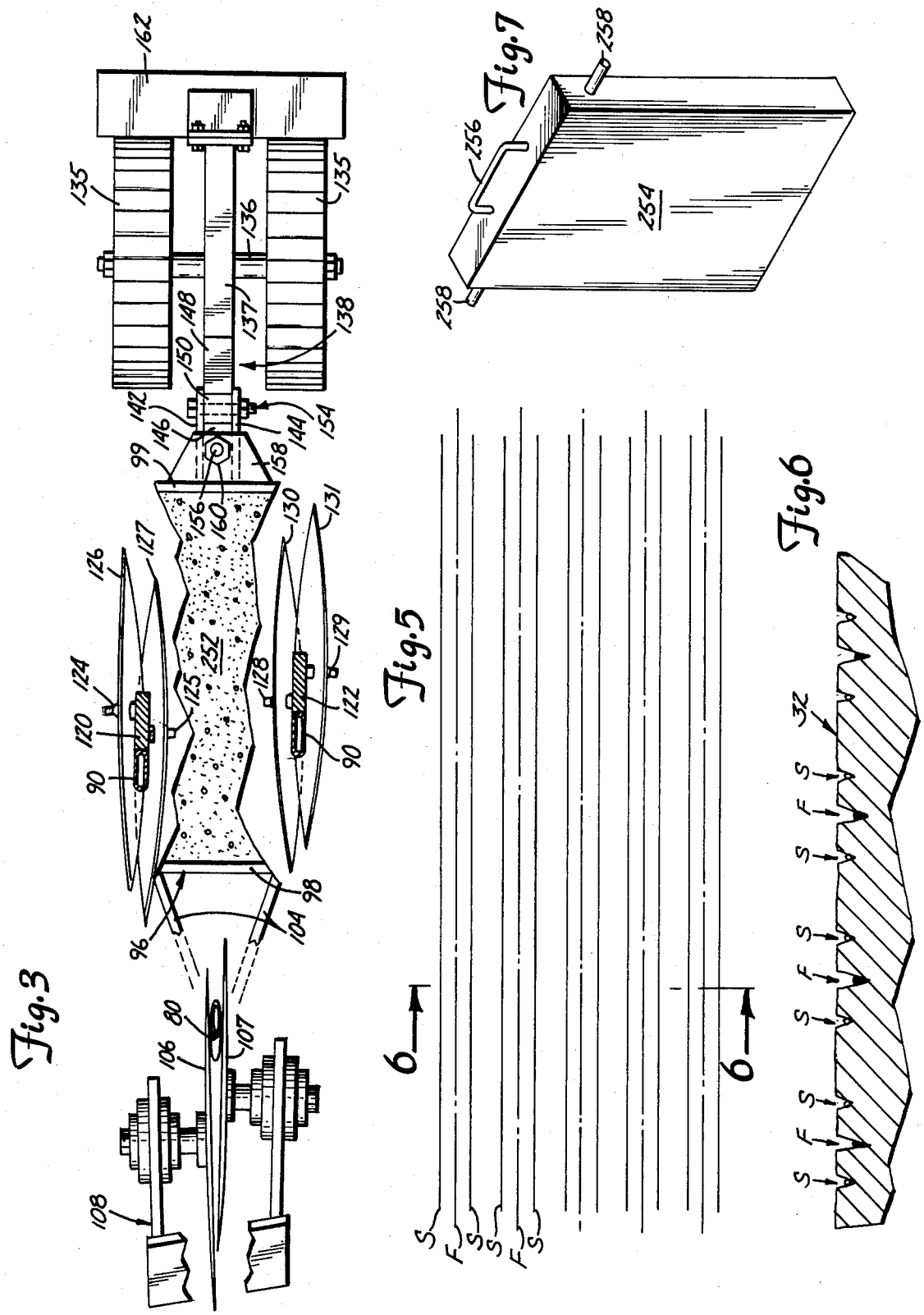
FIG. 3 (Sheet 3) is an enlarged schematic top view of the ground engaging components of one of the ground working units of the present invention, with some parts broken away and shown in section.

A plurality of ground engaging and working tools are secured below the unit frame 96 of each unit 95 as shown. A fertilizer tool mounting bracket 104 is secured to the unit frame 96 to extend forwardly and downwardly therefrom. A furrow opening tool configured as a pair of opener discs 106 and 107 is secured to the mounting bracket 104 adjacent a lower end thereof. The discs 106 and 107 are rotatably supported by a yoke 108, which in turn is secured to a disc depth adjustment mount 110. The disc depth adjustment mount 110 and fertilizer mounting bracket 104 each has a plurality of vertically spaced apertures 112 and 13 respectively therein which are aligned for reception of suitable fastening means, such as bolt and nut fasteners 114, to mount the discs 106 and 107 to the unit frame 96. The position of the opener discs 106 and 107 is thus adjustable vertically with respect to the unit frame 96. As best shown in FIG. 3, the discs 106 and 107 are rotatably supported on longitudinally staggered and laterally tilted axes by the yoke 108. The discs 106 and 107 engage at a point of convergence elevationally below their rotational axes in a conventional manner so that when the discs engage the ground (as shown in FIG. 4), a furrow is created.

Figure 4:
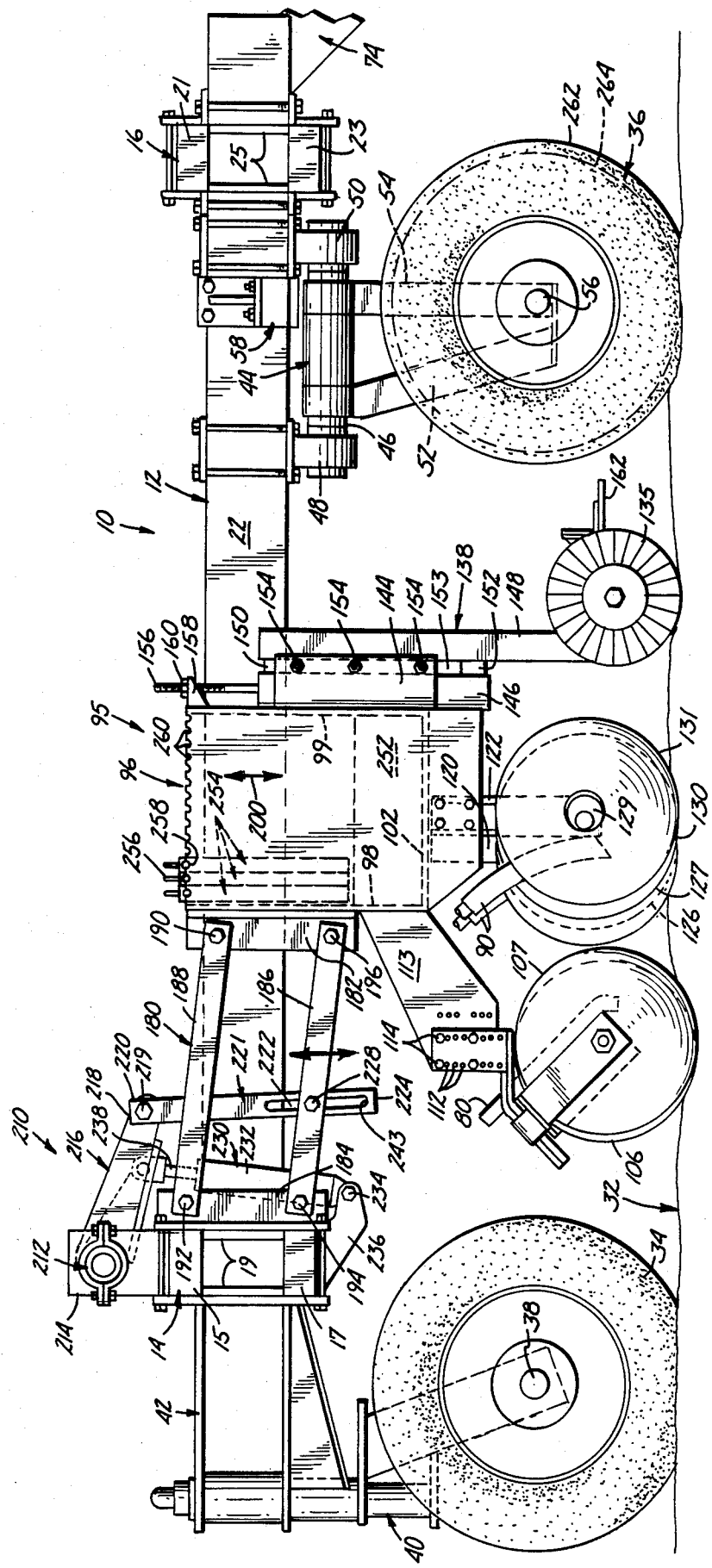
FIG. 4 (Sheet 4) is a side elevational view of the material dispensing implement of the present invention with its ground working units in their lowered ground engaging position.

A pair of seed drill mounting brackets 120 and 122 extend downwardly below the side walls 99 and 100, respectively, of the unit frame 96 and are spaced apart longitudinally (as illustrated in FIG. 2) and laterally (as illustrated in FIG. 4). As best shown in FIG. 4, first and second axle stubs 124 and 125 extend generally laterally from the seed drill mounting bracket 120 adjacent a lower end thereof. First and second seed drill discs 126 and 127 are rotatably mounted to the first and second axle stubs 124 and 125, respectively. The first seed drill disc 126 is mounted on first axle stub 124 on an axis inclined to and rearwardly of the axis of the second seed drill disc 127 mounted on the second axle stub 125. The first and second seed drill discs 126 and 127 engage at a point of convergence elevationally below their rotational axes in a conventional manner so that when the seed drill discs engage the ground, a furrow is created. Similarly, third and fourth axles stubs 128 and 129 extend generally laterally from the seed drill mounting bracket 122 adjacent a lower end thereof. Third and fourth seed drill discs 130 and 131 are rotatably mounted to the third and fourth axle stubs 128 and 129, respectively. The third and fourth seed drill discs 130 and 131 are staggered longitudinally in an opposite configuration from first and second seed drill discs 126 and 127. The fourth seed drill disc 131 is rotatably mounted on an axis of the fourth axle stub 129 which is inclined to the rearward of the axis of the third second drill disc 130 mounted on the third axle stub 128. The third and fourth seed drill discs 130 and 131 similarly tangentially engage at a point of convergence elevationally below their respective axes in a conventional manner in order to create a furrow when engaging the ground.

An end of one of the fertilizer drop tubes 80 is secured between the opener discs 106 and 107 of each ground working unit 95 as illustrated in FIGS. 2-4. Thus, after a furrow (such as furrow labeled F in FIGS. 5 and 6) has been created by engagement of the opener discs 106 and 107 with the ground, fertilizer is immediately dispensed from the fertilizer drop tube 80 into the bottom of said furrow. An end of one of the seed drop tubes 90 is similarly positioned between each pair of seed drill discs of each ground working unit 95. Thus, as the seed drill disc pairs engage the ground to create furrows (indicated as furrows S in FIGS. 5 and 6), seed is dispensed from the seed drop tube 90 into the bottom of each furrow S immediately after it has been created.

As shown, the seed drill discs are mounted to the unit frame 96 of each ground working unit 95 rearwardly from the fertilizer opener discs. In addition, the seed drill discs mounted to seed drill mounting bracket 120 are positioned slightly forwardly of the seed drill discs mounted on seed drill mounting bracket 122. This longitudinal staggering of the seed and fertilizer disc assemblies, along with the lateral staggering of the seed drill disc pairs and the reversing of the order of the leading seed drill discs thereon, diminishes the effect of trash build-up between and around the discs from prior crop stubble and other material which discs may encounter while engaging the ground. Such staggering also minimizes tendencies for side-to-side pulling of the implement 10 as the ground is being seeded or fertilized.

A gauge and packing wheel 135 is mounted to the unit frame 96 rearwardly of each pair of seed drill discs. The gauge and packing wheels are mounted in pairs on a common axle 136, which is connected by a longitudinal brace 137 to a gauge wheel mounting frame 138 which, in turn, is vertically slidably mounted with respect to the unit frame 96. A pair of spaced apart parallel plates 142 and 144 are secured to extend rearwardly from the back wall 99 of the unit frame 96. The gauge wheel mounting frame 138 includes a pair of spaced apart generally upright posts 146 and 148 secured together by spacer blocks 150 and 152 at each end of the post 146. As shown in FIGS. 2-4, the posts are slidably received between the plates 142 and 144. An elongated generally vertical open area 153 between the posts 146 and 148 and the spacers 150 and 150 is also positioned between the plates 142 and 144. A plurality of fasteners are secured to the plates 142 and 144 to extend through the open area 153. These fasteners, such as bolt and nut assemblies 154 are selectively tightened to force the plates 142 and 144 together to grip the posts 146 and 148.

A threaded rod 156 is fixedly secured to an upper end of the post 146 to extend upwardly therefrom and through an aperture in an ear 158 secured to the back wall 140. When the bolt and nut assemblies 154 are loosened, rotation of a nut 160 which is mounted on the threaded rod 156 above the ear 158 moves the threaded rod 156 with respect to the ear 158 and unit frame 96 to raise or lower the upright post 146 and thus the gauge wheel mounting frame 138 and gauge wheels 135. Since the gauge wheels 135 roll across the top of the ground 32, the changing of their position vertically with respect to the unit frame 96 determines the depth of penetration of the fertilizer and seed drill disc assemblies mounted on the unit frame 96.

The fertilizer drill disc assembly depth of penetration is further adjustable by means of moving the disc depth adjustment mount 110 with respect to the fertilizer tool mounting bracket 104. Typically, the fertilizer disc assembly is positioned to penetrate into the ground deeper than its cooperating seed disc assemblies. Thus, as the seed takes root downwardly, its roots will encounter the fertilizer after an initial growth period. A wiper blade 162 is mounted to the longitudinal brace 137 of the gauge wheel mounting frame 138 and positioned to scrape trash and accumulated soil from the gauge and packing wheels 135 as they rotate. As shown, each of the gauge and packing wheels 135 is positioned by the gauge wheel mounting frame 138 to compact the ground over and adjacent to each furrow opened by the seed drill discs mounted on the unit frame 96 forwardly thereof.

Linkage Assembly

Each ground working unit 95 is mounted to the forward lateral beam assembly 14 of the main implement frame 12 by a four-bar linkage assembly 180. The four-bar linkage assembly 180 preferably includes two four-bar linkages spaced laterally of each other and having common vertical links. Each linkage as viewed in FIGS. 2 and 4 includes a rear vertical link 182 secured to the unit frame 96 of the ground working unit 95, a forward vertical link 184 secured to the forward lateral beam assembly 14, a lower horizontal link 188 and an upper horizontal link 188. As mentioned, a second, similar four-bar linkage with the same four pivot points (designated respectively as 190, 192, 194, 196) is provided on the other side of each ground working unit 95, as partially illustrated in FIG. 1.

Each four-bar linkage assembly 180 thus permits its respective ground working unit 95 to move vertically independently of the other ground working units 95. Such movement as generally illustrated by arrows 200 in FIG. 4. The linkage assemblies 180, spaced laterally to trail behind the forward lateral beam assembly 14, permit each ground working unit 95 to specifically track the ground 32 being worked. This, in turn, permits precise and uniform placement of the seed and fertilizer at desired depths below the surface of the ground. In addition, the relative vertical difference between the seed and fertilizer furrows (if the fertilizer disc pair is fixed to create a furrow deeper than the seed disc pairs) does not change as the contour of the ground being worked varies. These features enhance crop yields because all seed is planted at a desired depth, with the fertilizer being applied in an efficient and economical manner as well.

Ground Working Unit Lift Assembly

While the linkage assemblies 180 permit each ground working unit 95 to move vertically independently of the other ground units 95, a unit lift assembly 210 is provided to move all of the ground units 95 simultaneously between a raised transport position (as shown in FIG. 2) and a lowered ground engaging position (as shown in FIG. 3). The unit lifting assembly 210 includes a lateral shaft 212 rotatably mounted on a generally horizontal lateral axis in a plurality of shaft journal mounts 214 which are secured to the forward lateral beam assembly 14. A plurality of lifter arms 216, one for each ground working unit 95, are fixedly secured to the shaft 212 to extend generally rearwardly therefrom substantially perpendicular to the axis of the shaft 212. An outer end 218 of each lifter arm 216 is pivotally secured to by a pin 219 to an upper end 220 of a lifter link 221. The lifter link 221 for each ground working unit 95 thus hangs downwardly from the outer end 218 of its respective lifter arm 216 to extend between the two four-bar linkages which comprises the four-bar linkage assembly 180 for said ground working unit 95. A generally upright elongated slot 222 extends through each lifter link 221 proximate a second end 224 thereof. Each linkage assembly 180 also includes a lateral pin 228 secured between the lower horizontal links 186 thereof to extend through the slot 222. The lifter link 220 is slidably movably with respect to the four-bar linkage assembly 180 along the pin 228 to track a path defined by the slot 222.

A plurality of selectively extensible hydraulic actuators 230 are provided to rotate the shaft 212 about its axis. Tractors typically have hydraulic fluid power systems (not shown) which are connected to the actuators in a conventional manner. As shown in FIGS. 2 and 4, a piston portion 232 of each actuator 230 has its end pivotally mounted as at 234 to an ear 236 secured to the second lateral beam 17 of the forward lateral beam assembly 14. An actuator lifter arm 240 is fixedly secured to the shaft 212 over each ear 236 to extend generally rearwardly therefrom substantially perpendicular to the axis of the shaft 212. A rod end 238 of each hydraulic actuator 230 is pivotally secured to its respective actuator lifter arm 240 as at 242. Preferably, there are two hydraulic actuators 230 (as shown in FIG. 1), and they are operably connected to simultaneously extend or retract.

When the actuators 230 are activated, their rod ends 238 are extended with respect to their piston portions 232 of the hydraulic actuator and the lifter links 220 are raised so that a bottom end 243 of each slot 222 affirmatively engages its respective pin 228 (see FIG. 4). Further extension of the rod ends 241 (to position as shown in FIG. 2) forces the lifter link 220 upwardly to pivot the four-bar linkage assemblies 180 upwardly (counterclockwise as viewed in FIGS. 2 and 4) with respect to the implement main frame 12 to their raised positions, which in turn moves all of the ground working units 95 to their raised positions. Retraction of the rod ends 238 of the hydraulic actuators 230 within their piston portions 232 lowers the ground working units 95 into engagement with the ground as shown in FIG. 4 by pivoting the four-bar linkage assembly 180 downwardly (clockwise as viewed in FIGS. 2 and 4). Whether the ground working units 95 are raised or lowered, the main frame 12 of the material dispensing implement 10 is supported on the ground 32 (at substantially the same height at all times) by the forward and rear wheels 34 and 36.

Ground Working Unit Ballast

Conservation no till farming involves the introduction of seed and fertilizer into ground which has not been recently tilled. The stubble from the previous crop has not been removed from the field and the soil has probably not been turned for many months. Thus, the ground is relatively hard and it is important to ensure adequate and even penetration of the fertilizer and seed drill assemblies on the ground working unit 95 into the ground. It is therefore necessary to place a desired amount of weight on each ground working unit 95 to control the force of penetration of the ground working tools thereon into the ground. To this end, a fixed ballast load 252 is mounted within the ballast chamber 97 of each ground working unit 95 as shown in FIG. 4. In addition, removable ballast loads 254 are securable within the ballast chamber 97 as well. The removable ballast loads 254 can take any suitable form, but are preferably configured as "suitcase" weights (see FIG. 7) having a handle 256 extending upwardly from an upper end thereof and a pair of pins 258 extending laterally therefrom for receptive engagement within pairs of matched grooves 260 spaced longitudinally along upper edges of the side walls 99 and 100 of the unit frame 96.

The fixed and removable ballast loads 252 and 254 thus provide means for providing and controlling the necessary ground penetration force on the ground engaging tools of each unit 95. This weight, once established, does not change as seed and fertilizer are dispensed so that the same penetration force is exerted at all times during a no till farming operation.

The removable ballast loads 254 provide additional means for controlling the force of penetration in that their position longitudinally within the ballast chamber 97 can affect the penetration force. If placed forwardly in the ballast chamber (more directly over the disc assemblies), the penetration force is greater than when the loads 254 are positioned rearwardly in the ballast chamber 97 adjacent the gauge wheel mounting frame 138.

Operation

For operation, the conservation no till farming system of the present invention is first transported to the field to be worked. Prior to such transport, the unit lift assembly 210 on the material dispensing implement 10 is activated to place to hydraulic actuators 230 in extended positions thereby rotating the shaft 212 and simultaneously moving all of the ground working units 95 to their raised transport positions. The ground working tools mounted on the ground working units 95 are thus sufficiently raised above the ground so that transport is possible without contact between those tools and the ground.

Once the implement 10 is positioned in the field to begin no till farming operations, the unit lift assembly 210 is activated to retract the hydraulic actuators 230 to pivot the shaft 212 in direction to move all of the ground working units 95 downwardly to their lowered ground engaging positions. The ground working tools mounted thereon thus engage the ground so that furrows will be created as the implement 10 is pulled through the field. Prior to the lowering of the ground working units 95, the ground working and furrow opening tools mounted thereon are adjusted to determine the depth of penetration of the tools and the depth of the furrows created thereby. The wheel mounting frame 138 is vertically adjusted with respect to the unit frame 96 to establish the furrow depth for the seed drill disc assembly. The fertilizer disc assembly penetration depth is further set by changing the vertical position of the disc depth adjustment mount 110 with respect to the fertilizer tool mounting bracket 104. The desired force of penetration of the ground working tools of the units 95 is established by placing a predesired number of removable ballast loads 254 within the ballast chamber 97 of each ground working unit 95.

Once the variables of force and depth of furrow penetration have been established as discussed above, the no till farming operation is begun. The tractor pulls the material dispensing implement 10 and seed and fertilizer particulate feeders 60 and 62 hitched therebehind through the field to create seed and fertilizer furrows (as shown in FIGS. 5 and 6), deposit seed and fertilizer into the furrows immediately after they are created and compact the ground over and adjacent each seed furrow.

The seed and fertilizer, which are supplied to the tools of each ground working unit 95 from the remote feeders 60 and 62 by suitable distribution systems, are deposited in the furrows immediately after they are created because as soon as the disc assemblies move on through the ground, soil falls back into the furrow covering the seed and fertilizer therein. The seed and fertilizer are thus deposited on the bottoms of their respective furrows and immediately become covered over with soil. The ground is thus minimally disturbed to reduce soil and moisture losses during plating. The gauge and packing wheels 135 of each ground working unit 95 immediately roll over the seed furrows and exert a compaction force determined by the amount of weight in the ballast chamber 97 of the unit 95. A portion 262 of each rear wheel 36 of the material dispensing implement 10 also rolls over each seed furrow to further compact the ground over and adjacent thereto. As shown in FIGS. 1, 2 and 4, each rear wheel 36 is shaped so that those portions 264 thereof which are aligned to roll over the ground between the two seed furrows created by each unit 95 (the ground over and adjacent that unit's fertilizer furrow) do not engage the ground in a compacting manner. It is undesireable to compact the ground over the fertilizer because to do so may cause germination of weed seeds contained therein. Such weed seeds would gain the benefit of the fertilizer to the detriment of the seed that is planted in the seed furrows.

After the entire field has been traversed as desired by the no till apparatus of the present invention, the hydraulic actuators 230 are again extended to simultaneously raise all of the ground working units 95 to their raised transport positions. The apparatus can then be moved to a new operation location or the depth and weight variables on each ground working unit 95 can be changed to accomodate varying ground conditions such as hardness.

Conclusion

The conservation no till farming apparatus of the present invention provides an apparatus for uniformly and precisely placing seed and fertilizer into the ground which is more versatile and accurate than prior art devices. The apparatus includes a ground working implement which has a plurality of laterally spaced ground working units with ground working disc pairs mounted thereunder. The height between some disc pairs on each unit are adjustable, as is the working height of each unit relative to the ground to control the depths of the furrows created thereby. The weight of each unit is also adjustable to control the force of penetration of the tools mounted thereon into the ground. All of the units are simultaneously movable between a raised transport position and a lowered ground engaging position. The supply of seed and fertilizer which is dispensed into the furrows created by each ground working unit is separately supported from the ground working units and the ground working implement so that as the weight of such materials decreases as they are dispensed, that changing weight has no effect on the force of penetration of the ground working tools under the ground.

Although the present invention has been described with reference to preferred embodiments, workers skilled in the art will recognize that changes may be made in form and detail without departing from the spirit and scope of the invention.

What is claimed is:

1. A conservation no till apparatus for distributing fertilizer and seed into the ground in one operation as moved through the field by a traction vehicle, the apparatus comprising:
    a main implement frame having ground engaging support wheels;
    first hopper means for carrying fertilizer;
    second hopper means for carrying seed;
    means for supporting said first and second hopper means separately from the main implement frame at all times;
    a plurality of ground working units mounted with respect to the main implement frame;
    linkage means for separately mounting the units with respect to the main implement frame in lateral spaced relation;
    means for simultaneously moving the units with respect to the main implement frame between a raised transport position and a lower ground engaging position, with the linkage means permitting each unit to move vertically independently of the other units when the units are in the ground engaging position so that each unit can independently follow the contour of the ground being worked;
    each ground working unit including:
        a unit frame;
        first furrow opening means mounted with respect to the unit frame for engaging the ground and creating a first furrow when the unit it in its ground engaging position,
        first means for dispensing fertilizer from the first hopper means into the first furrow,
        second furrow opening means mounted with respect to the unit frame for engaging the ground and creating a second furrow spaced laterally from the first furrow when the unit is in its ground engaging position,
        second means for dispensing seed from the second hopper means into the second furrow,
        first compaction means mounted to the unit frame for compacting the ground adjacent only the second furrow immediately after seed has been dispensed therein,
        height adjustment means on the unit frame for controlling the depth of penetration of the first and second furrow opening means into the ground, and
        weight adjustment means on the unit frame for controlling the force of penetration of the first and second furrow opening means into the ground; and
        second compaction means mounted to the main frame and aligned for further compacting the ground adjacent the second furrow after compaction thereof by the first compaction means.

2. The conservation no till apparatus of claim 1 wherein the first compaction means and height adjustment means for each ground working unit comprises:
    a mounting frame vertically movably mounted with respect to the unit frame of said unit and securable thereto; and
    a first gauge and packing wheel rotatably mounted on the mounting frame and aligned to roll upon the ground immediately longitudinally behind each second furrow opening means and for compacting the ground only adjacent each second furrow after seed has been dispensed therein.

3. The conservation no till apparatus of claim 1 wherein the second compaction means comprises:
    for each ground working unit, a respective one of the ground engaging wheels of the main implement frame which is disposed longitudinally behind said unit and aligned to track over the second furrow created by the second furrow opening means thereof.

4. The conservation no till apparatus of claim 3 wherein each ground engaging support wheel is aligned to roll over the first furrow and the second furrow created by one of the ground working units said support wheel including means for allowing compaction of the second furrow and avoiding compaction of the first furrow.

5. The conservation no till apparatus of claim 1 wherein each ground working unit further comprises:
    third furrow opening means mounted with respect to the unit frame for engaging the ground and creating a third furrow spaced laterally from the first and second furrows when the unit is in the ground engaging position; and
    third means for dispensing seed from the second hopper means into the third furrow.

6. The conservation no till apparatus of claim 5 wherein the compaction means for each ground working unit further includes:
    a second gauge and packing wheel rotatably mounted with respect to the mounting frame and aligned for rolling upon the ground immediately longitudinally behind each third furrow opening means and for compacting the ground only adjacent each third furrow after material has been dispensed therein, and wherein the second gauge and packing wheel of each one of the ground working units has a respective one of the ground engaging support wheels longitudinally disposed behind said second gauge and packing wheel for further compaction of the ground only immediately adjacent each third furrow.

7. The conservation no till apparatus of claim 6 wherein each ground engaging support wheel is aligned to roll over the first, second and third furrows created by one of the ground working units but only compacts the second and third furrows.

8. The conservation no till apparatus of claim 5, and further comprising:
   means for changing the depth of penetration of the first furrow with respect to the second and third furrows.

9. The conservation no till apparatus of claim 5, wherein the first compaction means is aligned to compact the ground adjacent the third furrow immediately after seed has been dispensed therein, and wherein the second compaction means is aligned longitudinally behind the first compaction means for further compacting the ground adjacent the third furrow after compaction thereof by the first compaction means.

10. The conservation no till apparatus of claim 5 wherein the first compaction means and height adjustment means for each ground working unit comprises:
    a mounting frame vertically movably mounted with respect to the unit frame of said unit and securable thereto;
    a first gauge and packing wheel rotatably mounted on the mounting frame and aligned to roll upon the ground immediately longitudinally behind each second furrow opening means and for compacting the ground only adjacent each second furrow after seed has been dispensed therein; and
    a second gauge and packing wheel rotatably mounted on the mounting frame and aligned to roll upon the ground immediately longitudinally behind each third furrow opening means and for compacting the ground only adjacent each third furrow after seed has been dispensed therein.

11. The conservation no till apparatus of claim 1 wherein each ground working unit further comprises:
    means for changing the depth of penetration of the first furrow with respect to the second furrow.

12. A conservation no till apparatus for distributing material into the ground in one operation as pulled through the field by a traction vehicle, the apparatus comprising:
    a main implement frame having a plurality of ground engaging support wheels;
    hopper means for supplying material to be worked into the ground;
    a plurality of ground working units mounted with respect to the main implement frame;
    linkage means for mounting the units separately to the main implement frame in lateral spaced relation;
    means for simultaneously moving the units with respect to the main implement frame between a raised transport position and a lowered ground engaging position, with the linkage means permitting each unit to move vertically independently of the other units when the units are in the ground engaging position so that each unit can independently follow the contour of the ground being worked;
    each ground working unit including:
    a unit frame,
    first furrow opening means mounted with respect to the unit frame for engaging the ground and creating a first furrow when the unit is in its ground engaging position,
    second furrow opening means mounted with respect to the unit frame for engaging the ground and creating a second furrow spaced laterally from the first furrow when the unit is in its ground engaging position,
    first means for dispensing material from the hopper means into the first furrow,
    second means for dispensing material from the hopper means into the second furrow,
    a mounting frame vertically movably mounted with respect to the unit frame and securable thereto,
    compaction means for each ground working unit which includes a first gauge and packing wheel rotatably mounted with respect to the mounting frame and aligned for rolling upon the ground immediately longitudinally behind each second furrow opening means and for compacting the ground only adjacent each second furrow after material has been dispensed therein, and
    weight adjustment means on the unit frame for varying the weight of the ground working unit and for controlling the force of penetration of the furrow opening means thereon into the ground;
    the first gauge and package wheel of each one of the ground working units having a respective one of the ground engaging support wheels longitudinally disposed behind said first gauge and package wheel for further compaction of the ground only immediately adjacent each second furrow; and
    ground engaging means for supporting the hopper means on the ground separately from the ground working units.

13. The conservation no till apparatus of claim 12 wherein each ground working unit further comprises:
    third furrow opening means mounted with respect to the unit frame for engaging the ground and creating a third furrow spaced laterally from the first and second furrows when the unit is in the ground engaging position; and
    third means for dispensing material from the hopper means into the third furrow.

14. The conservation no till apparatus of claim 13 wherein the compaction means for each ground working unit further includes:
    a second gauge and packing wheel rotatably mounted with respect to the mounting frame and aligned for rolling upon the ground immediately longitudinally behind each third furrow opening means and for compacting the ground only adjacent each third furrow after material has been dispensed therein, and wherein the second gauge and packing wheel of each one of the ground working units has a respective one of the ground engaging support wheels longitudinally disposed behind said second gauge and packing wheel for further compaction of the ground only immediately adjacent each third furrow.

15. The conservation no till apparatus of claim 14 wherein each ground engaging support wheel is aligned to roll over the first, second and third furrows created by one of the ground working units but only compacts the second and third furrows.

16. The conservation no till apparatus of claim 13 wherein fertilizer is the material dispensed into the first furrow by the first means for dispensing and seed is the material dispensed into the second and third furrows by the second and third means for dispensing, and the first furrow opening is aligned on the unit frame with respect to the second and third furrow opening means so that the first furrow is created laterally between the second and third furrows.

17. The conservation no till apparatus of claim 16, and further comprising:
  means for changing the depth of penetration of the first furrow with respect to the second and third furrows.

18. The conservation no till apparatus of claim 16, and further comprising:
  compaction means mounted with respect to the main implement frame for compacting only the second and third furrows.

19. The conservation no till apparatus of claim 12 wherein fertilizer is the material dispensed into the first furrow by the first means for dispensing and seed is the material dispensed into the second furrow by the second means for dispensing.

20. The conservation no till apparatus of claim 12, wherein each ground working unit further comprises:
  means for changing the depth of penetration of the first furrow with respect to the second furrow.

21. The conservation no till apparatus of claim 12 wherein the ground engaging means support the hopper means separately from the main implement frame.

22. The conservation no till apparatus of claim 12 wherein the unit frame of each of the ground working units includes a fixed ballast weight of equal weight and the weight adjustment means comprises:
  means for selectively adding additional weight to the unit frame.

23. The conservation no till apparatus of claim 22, and further comprising:
  means for positioning the additional weight longitudinally along the unit frame with respect to the direction of travel of the main implement to additionally control the force of penetration of the furrow opening means into the ground.

24. The conservation no till apparatus of claim 1 wherein the means for simultaneously moving the units comprises:
  a lifter link for each ground working unit, each lifter link having upper and lower ends and being movably mounted with respect to its respective linkage means between a first raised position wherein a portion of the lifter link proximate the lower end thereof affirmatively engages a portion of the linkage means and a second lowered position wherein the linkage means is slidably movable generally vertically with respect to the link and;
  means for simultaneously moving the lifter links between the first raised position and the second lowered position.

25. The conservation no till apparatus of claim 24 wherein the means for simultaneously moving the lifter links comprises:
  a shaft rotatably mounted with respect to the main implement frame on a lateral axis;
  a lifter arm for each ground working unit, each arm being fixedly secured to the shaft to extend substantially perpendicularly thereto and having an outer end thereof pivotally secured to the upper end of its respective lifter link; and
  means for rotating the shaft about its axis to pivot the lifter arms with respect to the shaft axis and simultaneously move the lifter links pivotally secured thereto between their first and second positions.

26. The conservation no till apparatus of claim 1 wherein each ground support wheel is aligned to roll over the first furrow and the second furrow created by one of the ground working units said support wheel including means for allowing compaction of the second furrow and avoiding compaction of the first furrow.

* * * * *